(12) United States Patent
Costa-Requena et al.

(10) Patent No.: US 7,181,537 B2
(45) Date of Patent: Feb. 20, 2007

(54) METHOD AND APPARATUS FOR ROUTING WIRELESS VILLAGE MESSAGES IN AN INTERNET PROTOCOL MULTIMEDIA SUBSYSTEM

(75) Inventors: Jose Costa-Requena, Helsinki (FI); Jyrki Aarnos, Kangasala (FI); Inmaculada Espigares, Helsinki (FI)

(73) Assignee: Nokia Corporation, Espoo (FI)

( * ) Notice: Subject to any disclaimer, the term of this patent is extended or adjusted under 35 U.S.C. 154(b) by 762 days.

(21) Appl. No.: 10/336,645

(22) Filed: Jan. 3, 2003

(65) Prior Publication Data

US 2004/0068584 A1 Apr. 8, 2004

Related U.S. Application Data

(63) Continuation-in-part of application No. 10/265,650, filed on Oct. 3, 2002.

(51) Int. Cl.
G06F 15/16 (2006.01)

(52) U.S. Cl. ................. 709/246; 709/245; 709/230

(58) Field of Classification Search ........... 709/230, 709/249, 245–246
See application file for complete search history.

(56) References Cited

U.S. PATENT DOCUMENTS

| | | | | |
|---|---|---|---|---|
| 5,175,817 | A * | 12/1992 | Adams et al. | 709/236 |
| 5,812,768 | A | 9/1998 | Pagé et al. | 395/200.09 |
| 6,038,603 | A * | 3/2000 | Joseph | 709/228 |
| 6,222,855 | B1 | 4/2001 | Kimber et al. | 370/466 |
| 6,253,248 | B1 * | 6/2001 | Nakai et al. | 709/237 |
| 6,282,281 | B1 * | 8/2001 | Low | 379/230 |
| 6,282,579 | B1 * | 8/2001 | Carre | 719/313 |
| 6,405,254 | B1 | 6/2002 | Hadland | 709/230 |
| 6,470,010 | B1 * | 10/2002 | Szviatovszki et al. | 370/356 |
| 6,625,141 | B1 * | 9/2003 | Glitho et al. | 370/352 |
| 6,683,881 | B1 * | 1/2004 | Mijares et al. | 370/401 |
| 6,704,396 | B2 * | 3/2004 | Parolkar et al. | 379/88.17 |
| 6,757,732 | B1 * | 6/2004 | Sollee et al. | 709/227 |
| 6,988,143 | B2 * | 1/2006 | O'Neill et al. | 709/230 |
| 2003/0076815 | A1 * | 4/2003 | Miller et al. | 370/401 |
| 2004/0037406 | A1 * | 2/2004 | Gourraud | 379/202.01 |

OTHER PUBLICATIONS

T. Berners-Lee, L. Masinter, M. McCahill. Uniform Resource Locators (URL). RFC 1738. Dec. 1994.□□*

M. Handley, H. Schulzrinne, E. Schooler, J. Rosenberg. SIP: Session Initiation Protocol. RFC 2543. Mar. 1999.□□*

(Continued)

Primary Examiner—Krisna Lim
Assistant Examiner—Brendan Y. Higa
(74) Attorney, Agent, or Firm—Ware, Fressola, Van Der Sluys & Adolphson LLP

(57) ABSTRACT

A method, and related equipment, for interoperating between a device (11a) in a first network, such as an IMS network, and a device (12a) in a second network (12), such as a WV network, the first network using a first protocol (SIP) requiring that a message have a request uniform resource identifier including an address scheme, and the second network (12) using one or more other protocols. The method includes a step (41) of converting a message constructed according to the first protocol (SIP) but having as an address scheme indicating a protocol of the second network (such as "wv:") to a message in which the address scheme is changed (e.g. to "sip:") to indicate the protocol of the first network and in which a user uniform resource locator parameter is provided having a value indicating the original scheme, before conversion (i.e. "wv" in the example given).

22 Claims, 4 Drawing Sheets

OTHER PUBLICATIONS

K. Singh and H. Schulzrinne, "Interworking between SIP/SDP and H.323," Internet Draft, Internet Engineering Task Force, Jan. 2000.*

"Wireless Village—The Mobile IMPS Initiative; System Architecture Model" v 1.1, 2001-2002 Ericsson, Motorola and Nokia.

"Wireless Village—The Mobile IMPS Initiative; Features and Functions" v1.1, 2001-2002, Ericcson, Motorola and Nokia.

"Wireless Village—The Mobile IMPS INitiative; Client-Server Protocol Transport Bindings" v 1.1, 2001-2002 Ericsson, Motorola and Nokia.

"Wireless Village—The Mobile IMPS Initiative; Server-Server Protocol XML Syntax Document" v 1.1, 2001-2002 Ericsson, Motorola and Nokia.

"Wireless Village—The Mobile IMPS Initiative; Client-Server Protocol DTD and Examples" v 1.1, 2001-2002 Ericsson, Morotola and Nokia.

3GPP TS 29.228 v5. 1. 0 (Sep. 2002); 3rd Generation Partnership Project; Technical Specification Group Core Network; IP Multimedia (IM) Subsystem Cx and Dx Interfaces; Signalling Flows and Message Contents (Release 5).

"Wireless Village—The Mobile IMPS Initiative; SSP—Server to Server Protocol Semantics Document" v 1.1 2001-2002, Ericsson, Motorola and Nokia.

"Wireless Village—The Mobile IMPS Initiative; Client-Server Protocol Session and Transactions" v 1.1, 2001-2002, Ericsson, Motorola and Nokia.

"ENUM Usage Scenarios", S. Lind, Internet Draft draft-ietf-enum-usage-scenatios-00.txt, Jun. 6, 2002.

RFC 2778, "A Model for Presence and Instant Messaging", M. Day et al, Feb. 2000.

H. Sinnreich et al, "Internet Communications Using SIP—Delivering VoIP and Multimedia Services with Session Initiation Protocol", John Wiley & Sons, New York, 2001, pp. 21-22.

* cited by examiner

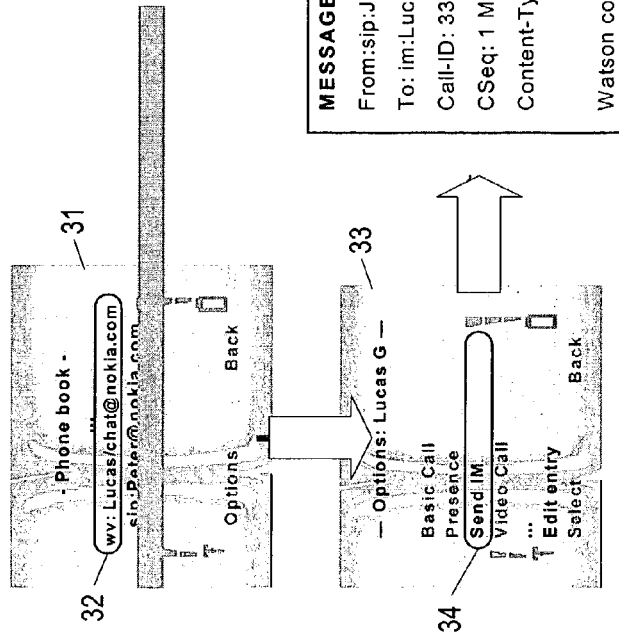

METHOD AND APPARATUS FOR ROUTING WIRELESS VILLAGE MESSAGES IN AN INTERNET PROTOCOL MULTIMEDIA SUBSYSTEM

CROSS REFERENCE TO RELATED APPLICATIONS

This application is a continuation-in-part of co-owned U.S. application Ser. No. 10/265,650 filed on Oct. 3, 2002, and entitled WV-IMS RELAY AND INTEROPERABILITY METHODS.

TECHNICAL FIELD

The present invention relates to interoperability between end-user devices designed for use in similar but different kinds of telecommunication systems, different in respect to the protocols used between the servers and between the servers and the devices. More particularly, the present invention relates to interoperability between a first telecommunication system that primarily uses a single protocol throughout and a second system that uses different protocols between its servers and between its servers and its devices.

BACKGROUND ART

The present invention provides interoperability for routing between a first telecommunication system that primarily uses a single protocol throughout and a second system that uses different protocols between its servers and between its servers and its devices. Such a first system is exemplified by an Internet Protocol Multimedia Subsystem (IMS) according to the third generation partnership project (3GPP) while such a second system is exemplified by a Wireless Village (WV) system, per the Mobile Instant Messaging and Presence Services (IMPS) Initiative formed in April 2001 to define and promote a set of universal specifications for mobile instant messaging and presence services. Therefore, an exemplary but non-limiting application of the present invention enables WV clients to interoperate with IMS clients.

FIG. 1 shows a WV system 12 including a WV server 12b and a WV client 12a. According to the WV "System Architecture Model version 1.1," a WV system is a client-server based system where the server is an IMPS (Instant Messaging and Presence) server and the clients can be either mobile terminals or other services or applications for fixed PC clients. The WV server 12b and WV client 12a communicate according to either client-server protocol (CSP) or command line protocol (CLP). For interoperability, the WV servers (and gateways) from different domains are connected by a server-to-server protocol (SSP) defined in various WV specifications now published at version 1.1, which may be found at www.wirelessvillage.com. If a WV server receives a message addressed to a user within the same domain as the WV server, the WV will send the message to the user using CSP or CLP instead of SSP.

Also shown in FIG. 1 is an IMS 11 including an IMS server 11b and an IMS client 11a. As mentioned above, the IMS entities 11a 11b communicate using a single protocol (i.e. SIP) that is standardized by the IETF (Internet Engineering Task Force).

Because of the use of different protocols by WV systems and IMS systems, providing communication between clients of the two different systems is problematic. To compound the problem, there may be some operators who deploy the IMS but not the WV, and other operators who deploy the WV but not the IMS but nonetheless wish to offer their customers access to the other service.

Co-owned U.S. application Ser. No. 10/265,650 filed on Oct. 3, 2002, and entitled WV-IMS RELAY AND INTEROPERABILITY METHODS adds mapping functionality (i.e. protocol translation services) to an Application Server (AS) of a 3GPP IMS (or to an IMS/WV gateway either coupled to the AS so as to be part of the AS or existing as a standalone server), mapping functionality that provides for translating addresses between a WV server of a WV system and the AS to permit interoperability between WV clients and IMS clients and so to allow, optionally, for instant messaging and presence services for operators who have deployed both IMS and WV or only one of the WV and IMS systems. The AS coupled with the IMS/WV gateway (or the IMS/WV gateway as standalone server), thus serves as an IMS/WV relay. Due to the possibility that an operator may have deployed WV but not IMS and due to the use of a CSP between WV clients and WV servers and the use of SSP between WV servers, the mapping functionality is structured to permit an IMS client device to register for a session with a WV system via the IMS/WV relay performing an SIP/CSP or SIP/CLP conversion so as to emulate a WV device login but to then use the SSP to maintain the session or to deliver a message or presence information. Likewise, the functionality enables a WV device to register directly into IMS for operators not deploying WV using the IMS/WV relay.

What is still needed is a specific procedure for translating a SIP address within any message from an IMS client into a message according to a protocol understood by a WV client.

DISCLOSURE OF THE INVENTION

Accordingly, in a first aspect of the invention, a method is provided for interoperating between a device operable in a first network (such as an IMS network) and a device operable in a second network (such as a WV network), the first network having a first server for communicating with the first device using a first protocol (such as SIP) requiring that a message have a request uniform resource identifier including an address scheme, the second network having a second server for communicating with other servers in said second network using a second protocol (such as SSP) and with the second device using a third protocol (such as CSP or CLP) possibly different from the second protocol (SSP), the method characterized by the steps of: a step of converting a message constructed according to the first protocol (SIP) but having as the address scheme a value (such as "wv:") indicating a protocol of the second network, to a message in which the address scheme has instead a value (such as "sip:") indicating the protocol of the first network, and the message also having a user uniform resource locator parameter with a value (such as "wv") indicating a protocol of the second network; and a step of transmitting the converted message on a communication path leading to a gateway element.

In accord with the first aspect of the invention, the first device may perform the step of converting the message.

Also in accord with the first aspect of the invention, the first server may perform the step of converting the message.

Still also in accord with the first aspect of the invention, the method may also include a step of translating to the second protocol (such as SSP) or to the third protocol (such as CSP or CLP) the converted message received according to the first protocol (such as SIP) from the first server or to the third protocol the message received from the first device without using the first server, and communicating the translated message to the second network (e.g. a WV network). Further, the first network may be an IMS network, and the step of translating may be performed by a gateway accessible to an Application Server (AS) connected to the first network. Alternatively, the first network may be an IMS network including call state control function entities, and the step of translating may be performed by a gateway accessible to the IMS network entities connected to said first network.

In a second aspect of the invention, a device is provided operable according to the method of operation of the first device as set out in the first aspect of the invention.

In a third aspect of the invention, a server is provided operable according to the method of operation of the first server as set out in the first aspect of the invention.

In a fourth aspect of the invention, an apparatus is provided comprising means for performing the step of translating the converted message to the second protocol (such as SSP) or to the third protocol (such as CSP or CLP), as the step of so doing is set out in the first aspect of the invention.

In a fifth aspect of the invention, a system is provided, comprising: a device as provided in the second aspect of the invention, a server as provided in the third aspect of the invention, and an apparatus as provided in the fourth aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 2 is a text block showing the format for an SIP address according to the invention, and so including a new user URL parameter value of "wv" indicating that the address is actually a WV address, not a SIP (IMS) address;

FIG. 3 is a pictorial illustration of the use of the new user URI (uniform resource identifier) parameter value "wv" from the perspective of a user of a mobile terminal (an IMS client) according to one possible embodiment of the invention;

BEST MODE FOR CARRYING OUT THE INVENTION

Figure 1:
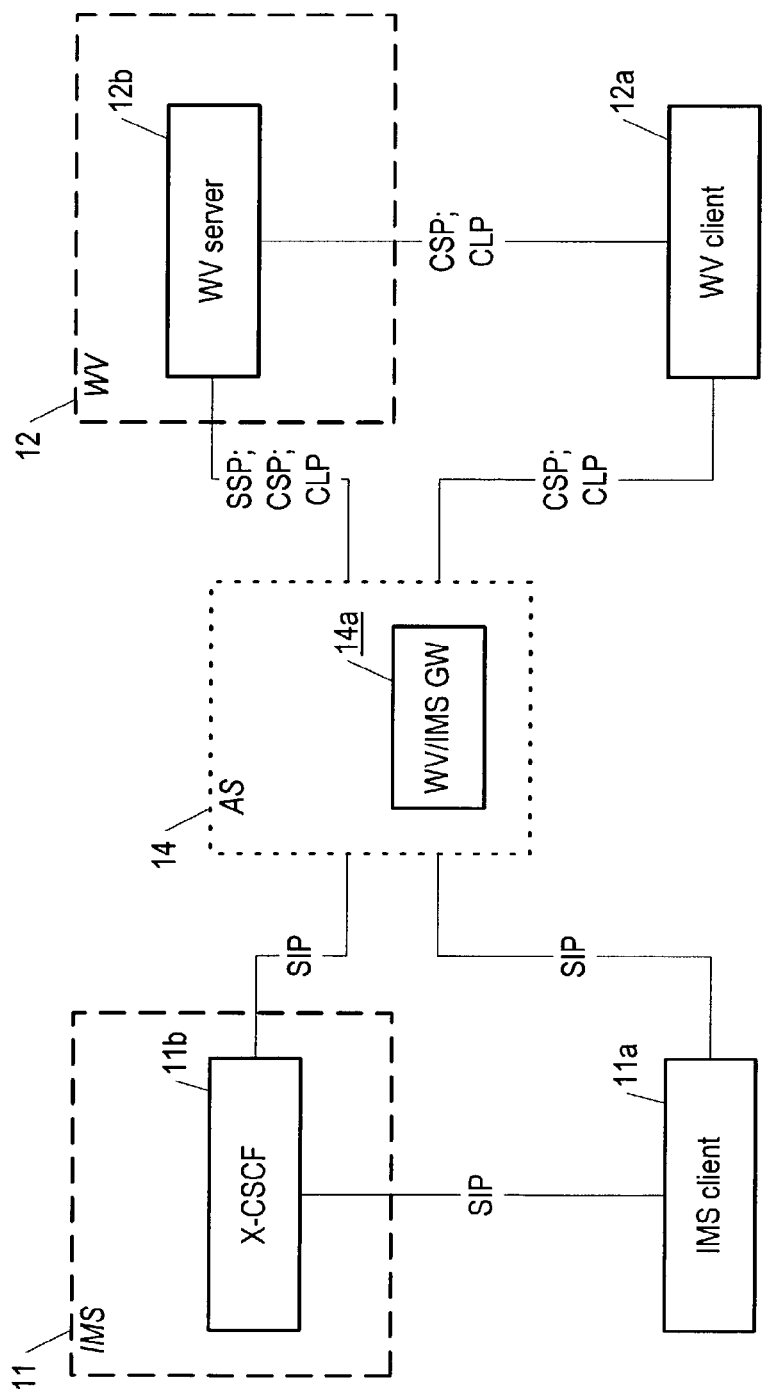
FIG. 1 is a block diagram/flow diagram showing a terminal and network elements, including a gateway element, involved in the routing of a message from an IMS network to a WV network.

According to the invention, an IMS terminal or server interprets a "wv:" scheme of a URI (uniform resource identifier) of a message (SIP URI except for the "wv:" scheme) and converts the message so as to have a SIP URI ("sip:"), and includes in the message a URI parameter (;user=wv) for indicating that the original URI contained a WV scheme, thereby enabling the correct mapping at the end point in the path to the intended destination.

The invention provides an extension to SIP (session initiation protocol) used in an IMS (Internet Protocol Multimedia Subsystem) network so that an IMS client can address a client of a WV (Wireless Village) network. The extension—a new user URI (Uniform Resource Identifier) parameter value "wv"—enables a terminal or any intermediate network element to convert a WV address in an otherwise SIP compliant message into a fully compliant SIP address by replacing the WV address (such as wv:username@operator.fi) with an IMS (SIP) address (sip:username@operator.fi) and adding to the address the new user URI parameter value ("wv") to indicate that the address is really in fact a WV address, i.e. that the intended recipient is a WV client. (FIG. 3, described below, shows a message having a WV address being converted to an IMS (SIP) address a portable terminal operative as an IMS client.)

WV clients use protocols different than SIP to communicate with WV servers. Corresponding to the extension provided by the invention, functionality is added to either a terminal operative as an IMS client or to an IMS network element (such as a P-CSCF, i.e. Proxy-Call State Control Function, or a S-CSCF, i.e. a Serving-CSCF) to which such a terminal would be connected via a RAN (Radio Access Network); the functionality added to either a terminal device or IMS server device allows the device to make use of the extension either only as needed (in case the IMS core network would rejects the message provided without the extension and using only the WV address) or as a matter of course (whether or not the extension is needed). In addition, functionality is added to, or made accessible to, an Application Server (AS) of the WV network that performs the role of an IMS/WV gateway, for translating a message converted according to the invention (i.e. a message converted so as to have a SIP address scheme ("sip:") but so as to include the new user URI parameter "wv") into an equivalent message according to a protocol (typically CLP, i.e. command line protocol, or CSP, i.e. client-server protocol) appropriate for delivery to the intended recipient, a WV client. Alternatively, such translation functionality can be added to a gateway accessible to the call state control function entities of the IMS.

In providing an extension to the SIP protocol used in an IMS network so that an IMS client can address a client of a WV network, the invention enables the routing of SIP messages with WV addresses across IMS networks that only permit SIP addresses (i.e. messages with sip: as the address scheme) by making available the new "user" URI parameter value ("wv"). The 3GPP architecture (Release 5) does not allow a non-SIP address to be routed through an IMS network, but this constraint is expected to be removed in future releases. Thus, currently, IMS network elements can (but do not always) reject a SIP message that contains a non-SIP address. The use of the new user URI parameter provides a way to have a message that has a WV address, but is otherwise an SIP message, routed through an IMS network to an intended WV client, whether or not the IMS network allows such messages.

The idea behind the invention is to allow an operator that first deploys WV and then later deploys an IMS network to continue to provide access to the WV users from the IMS network. Thus WV users of the network of such an operator must be accessible from the IMS network and so the IMS network must have a IMS/WV gateway. In addition, the operator should be able to receive messages addressed to its WV users from other IMS networks. To do so, in response to a DNS (domain name space) query (described below), the operator should indicate that it is able to support WV service and the DNS response should return the address of the IMS network element that can receive those messages. A typical scenario would be as follows. The S-CSCF in the originating network receives a SIP message from an IMS client that includes the address of a WV user as the destination. The S-CSCF performs DNS queries as needed to determine whether the destination network supports WV service but can only receive SIP messages. Thus, operators will use IMS networks for inter-domain communications even for WV users. The destination network will inform the originating network (i.e. the S-CSCF of the originating network) that it can receive the message addressed to the WV user but will do so using an IMS network. Based on the response from the DNS server, the S-CSCF will convert the WV address into an SIP address and add the new user URI parameter ("wv"), guaranteeing that any intermediate IMS network (i.e. in particular, and IMS Release 5 that only supports sip: and tel:) will route the message to the destination IMS network. The destination network will receive the message via one of its IMS servers, and will then check the message and determine that the message is addressed to one of its WV users; the IMS server will then route the message to its IMS/WV gateway where it will be translated into a message according to a protocol suitable for routing or ultimate delivery to the WV user (i.e. either SSP, CSP or CLP).

According to the invention, either the IMS client sending a message to a WV address or else a server in the IMS network, preferably the CSCF server serving the IMS client, either use the new user URI parameter "wv" to convert a message having a WV address (e.g. wv:username@operator.fi) but otherwise SIP URI, to a message having a SIP address (e.g. sip:username@operator.fi) and the user URI parameter value "wv", or do so only after trying the WV address but receiving a "bad message" error from the IMS core network.

In case the S-CSCF server or another IMS server (as opposed to the IMS client itself) takes care of getting a WV address message through the IMS core network to a gateway server (where the message is translated into a message according to a protocol used in the WV network to which the intended recipient of the message, a WV client, is connected), the S-CSCF server determines the next hop in the IMS network in the path to the destination. The S-CSCF receives the message from the client in the originating domain and using DNS or any other location service (database) determines the next hop in the IMS network or in a different network in case e.g. the message is addressed to a user from the Internet or from a GSM domain. The S-CSCF determines the next hop based on the destination address included in the message. If the address is a phone number, the S-CSCF performs a DNS query using NAPTR records and the response includes the address of the network element responsible for routing message to the destination user. If the destination user belongs to, i.e. is a subscriber to the services of, the same operator but the user is a GSM user, the DNS response may return the address of the border gateway to the GSM network of the operator (although in case of the local domain, it need not always be the DNS that is used; it can be some specific configuration file or database that maintains all the addresses of the gateway and/or the border gateway that in this case is the one used for interoperability with GSM). If the destination user belongs to another operator but is connected to the same IMS network as the sending user, the DNS response should return the address of the IMS network entity that will handle the message; usually, the address of an I-CSCF is returned in such a case. Thus, the S-CSCF determines the address of the next hop server using DNS or some other location service, and sometimes the next hop element is an IMS server of the destination domain and sometimes it is the local gateway for GSM users.

In determining the next hop, as mentioned, the S-CSCF makes queries of a location service such as DNS. In case of queries to DNS, the S-CSCF uses DNS with naming authority pointer (NAPTR) or service records (SRV) to determine whether the destination network can support WV or SIP messages. In case the destination network has IMS elements and supports SIP, the message with a non-SIP URI is sent as such without changes. If any intermediate network element returns an error message (such as "Bad URI") the S-CSCF uses the new user URI parameter value ("wv") provided by the invention and resends the message. If the DNS responds that the destination network supports WV but that the local network does not have a gateway for routing messages using the WV protocol, the S-CSCF uses the new user URI parameter value to route the message via IMS.

Referring now to FIG. 1, according to the invention, an IMS client 11a of an IMS network 11, in order to communicate with a WV client 12a of a WV network 12, creates an address header according to SIP as extended by the invention (described below) and transmits the message either directly to an IMS server 11b (typically one or another type of CSCF, i.e. possibly a P-CSCF which forwards the message to an S-CSCF, which cooperates with an I-CSCF to resolve the address), which then forwards the message to the AS 14 with the added IMS/WV gateway feature 14a, or the message is forwarded directly to an IMS/WV gateway to translate the message into WV in case the destination user is a WV client that belongs to the same domain (based on the extension included in the SIP address, as described below).

To implement the invention, the IMS client 11a or a network element P-CSCF or S-CSCF in the originating network must include functionality for making use of the extension to SIP addressing provided by the invention. In addition, until the message is translated into a protocol appropriate for delivery to the intended WV client 12a, nodes in the path leading to the intended WV client 12a must interpret the extension and recognize that the address was originally addressed to a WV user (i.e. must understand that the user URI parameter "wv" indicates that the message originally had a WV address), in order to direct the message to the IMS/WV gateway or the AS 14 connected with an IMS/WV gateway (unless the AS already incorporates IMS/WV gateway capabilities, as shown in FIG. 1). Upon receiving such a message, the AS 14 uses its IMS/WV gateway 14a to translate the message from the IMS client 11a to a protocol appropriate for delivery to the intended WV client 12a. It should be understood, as mentioned, that the IMS/WV gateway 14a can be included as part of the AS 14 or it can be a separate module or server accessible to the AS 14 or to other network elements such as an interrogating CSCF (I-CSCF).

When the destination of a message is a WV user in a WV network and the message originates in an IMS network, the message must always be translated to CSP or CLP eventually, and for that a IMS/WV gateway is required. However, the IMS/WV used to perform the translation can be located in either the originating or the destination network. The message can be routed entirely through IMS and the IMS/WV gateway is required in the destination domain for the translation into WV protocol (CSP or CLP). The alternative is that the originating network finds out that the destination recipient is a WV user and forwards the message to an IMS/WV gateway in its own (the originating) domain and from there the message is routed to the destination domain all the way via the WV network.

Still referring to FIG. 1, the WV client 12a is shown connected directly to the AS 14 so as to include the possibility that the AS 14 itself performs the translation to CSP or CLP and so performs the service that would ordinarily be performed by the WV server 12b. In addition, the AS 14 is shown communicating with the WV server 12b using not only SSP but also possibly CSP and even possibly CLP, although ordinarily only SSP would be used.

As mentioned, an alternative to including in the IMS client 11a the functionality for making use of the extension, i.e. the functionality can instead be located in the first hop—the Proxy CSCF (P-CSCF) server or in the S-CSCF server—between the IMS client 11a and the core IMS network. The functionality can for example be included in the S-CSCF that has the role of finding the next hop in the path to the destination based on the address information contained in the message. The S-CSCF server includes a databases with a list of local I-CSCF servers (or local gateway addresses in case of routing to GSM domain as mentioned above), address databases, and other databases such as DNS in order to query the destination network about the address of the next-hop server or the protocols that the destination network supports. In this case, where the functionality (for using the new user URI parameter "wv") is included in the S-CSCF, the terminal just places the WV address (wv:username@operator.fi) in the message, so that the message created by the terminal is not fully SIP-compliant (only on account of its having a WV address). Then the next-hop network element (P-CSCF or S-CSCP), upon receiving the message, first tries to forward it as is, and in case any intermediate network elements rejects it (because of a mal-formed address), the next-hop network element converts the message according to the invention, changing the address so as to be SIP URI (sip:username@operator.fi) but using the new user URI parameter value "wv" to indicate that the intended recipient is a WV client.

As indicated above, the protocols used by WV include SSP for communication among WV servers, and CSP and CLP for communication between a client and a server. As is true of all communication protocols, each of these protocols uses a so-called addressing scheme. A scheme of an address, or more properly of a URI, is the part of the URI that tells a client (e.g. an HTML client or an XML client, i.e. extensible markup language client), such as a browser, which access method to use to retrieve the file specified in the URI, or in other words which protocol to use when searching for the address of the file specified. A scheme consists of a token followed by a colon and placed at the beginning of an address (e.g. 'sip:' or 'wv:' or 'mailto:' or 'http:'). The protocol in IMS for communication between any entities (servers or clients), namely SIP, uses a different address scheme than the address scheme used in WV (i.e. the scheme "wv:").

The generic syntax for addressing in SIP is as follows:

```
SIP-URI = "sip:" [ userinfo "@" ] hostport uri-parameters [ headers ]
userinfo = [ user | telephone-subscriber [ ":" password ] ]
hostport = host [ ":" port ]
host = hostname | IPv4address | IPv6reference
hostname = *( domainlabel "." ) toplabel [ "." ]
uri-parameters = *( ";" uri-parameter )
uri-parameter = transport-param / user-param / method-param /
    ttl-param / maddr-param / lr-param / other-param
transport-param = "transport=" ( "udp" / "tcp" / "sctp" /
    "tls" / other-tranport )
other-transport = token
user-param = "user" ( "phone" / "ip" / other-user )
other-user = token
```

The WV "UserID/Resource" is equivalent to the "userinfo" in SIP URI, and the "Domain" part from WV address is comparable to "hostport" in SIP URI. Thus, the addresses in WV (SSP/CSP) and IMS (SIP) are similar but the transport protocols are different, and a mapping (performed by the IMS/WV gateway 14a) from one to the other is required. In IMS, the transport protocol is SIP or HTTP (hypertext transport protocol) while in the WV domain it is WSP (wireless session protocol), HTTP or HTTPS (secure HTTP). The addresses are similar but differ in the scheme that are used (wv: for WV and sip: for SIP messages).

Now, as explained above, according to the invention another parameter value—namely "wv"—is added to the possible user parameter values so that the user-param (parameter) field (of the above syntax) is changed to:

user-param="user"("phone"/"ip"/"wv"/other-user

FIG. 2 shows the complete syntax 21 as extended by the invention so as to include "wv" as a new user URI parameter value 21a.

Referring now to FIG. 3 (and also to FIG. 1), a conversion in the IMS client 11a of an SIP URI address for the WV client 12a (FIG. 1) is illustrated from the user perspective; displays 31 33 provided by a wireless terminal during a conversion according to the invention are shown in the figure. The conversion illustrated in FIG. 3 assumes that the IMS client 11a (a wireless terminal) automatically itself converts a WV address to an SIP URI address without first trying the WV address. The IMS client 11a can also try to send the message with the original "wv:" scheme in the address and if the first hop server (P-CSCF) returns a "Bad URI" or similar error response indicating that the address is not supported, the IMS client 11a should then convert the address into a fully compliant SIP URI address, using the user URI parameter provided by the invention ("wv"). This scenario is likely to happen when the IMS client is roaming and the visited network does not support any non-SIP URIs. The IMS client should have the ability to address WV clients 12a independently if accessing the local IMS network or any other visited network with limited capabilities (only support for SIP URI addresses).

Still referring to FIG. 3, two displays 31 33 of the screen of the sending IMS client 11a are shown during the conversion of a message having a WV address (i.e. using the "wv:" address scheme) into a message having a SIP address (i.e. using the "sip:" address scheme) and including the new user URI parameter value "wv" to indicate that the message was converted from one having the "wv:" address scheme; the full message being sent, including its content, is indicated in FIG. 3 as a text block 35. On the displays 31 33, a rounded rectangle, such as rounded rectangle 32, is used to indicate a selection being made. The conversion process is shown as beginning with the act by the user of selecting the address 32 of the WV client 12a (wv:Lucas/chat@nokia.com in the example given). Next, the user selects the option 34 of "Send IM" (i.e. send instant message). The IMS client, i.e. the terminal being used by the user, converts the message to the message shown in text block 35, so that it includes the new user URI parameter value 36—namely the value "wv"—provided by the invention and used the "sip:" address scheme in place of the "WV:" address scheme.

Figure 4:
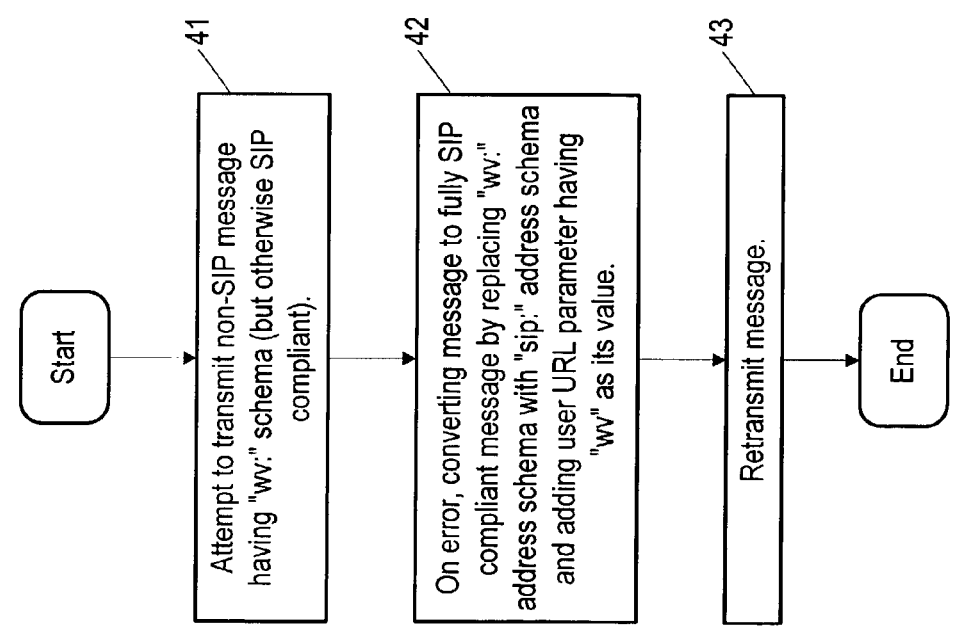
FIG. 4 is a flowchart showing a method in which a message having a WV address (i.e. having a "wv:" address scheme) is converted to a SIP URI and so is able to be routed through an IMS core network to the gateway element of FIG. 1.

Referring now to FIG. 4, a flowchart of the operation according to the invention of either the IMS client 11a or an IMS server to which the IMS client is connected (via a RAN) invention is shown. The flowchart shows a first step 41 of attempting to transmit a non-SIP URI message having "wv:" scheme (but otherwise SIP compliant address). If the device performing the indicated step is the IMS client 11a, then it would have first created the message. If the device performing the indicated step is a server 11b (e.g. a P-CSCF or a S-CSCF server) of the IMS network 11 to which the IMS client 11a is connected (via a RAN), then it would have first received the message from the IMS client 11a. In a next step 42, the device receives an error message and so converts the message to a message with an SIP URI by replacing the "wv:" address scheme with the SIP address scheme ("sip:") and by also adding the user URI parameter "wv" to the message address. The converted message should use "sip" or "sips" in the Request URI or "Route" header (used mainly for routing an SIP message) but "sip:" or "sips:" or "wv" or "im:" or "pres:" as an address scheme in the "To:" header to avoid having any intermediate network entity reject the message because of unsupported scheme (error message 416 or Bad URI). (The message should use "im:" or "pres:" as an address scheme in the "To:" header when there is no previous knowledge that the destination user is located in WV domain.) In a next step 43, the device retransmits the now-converted message.

Figure 5:
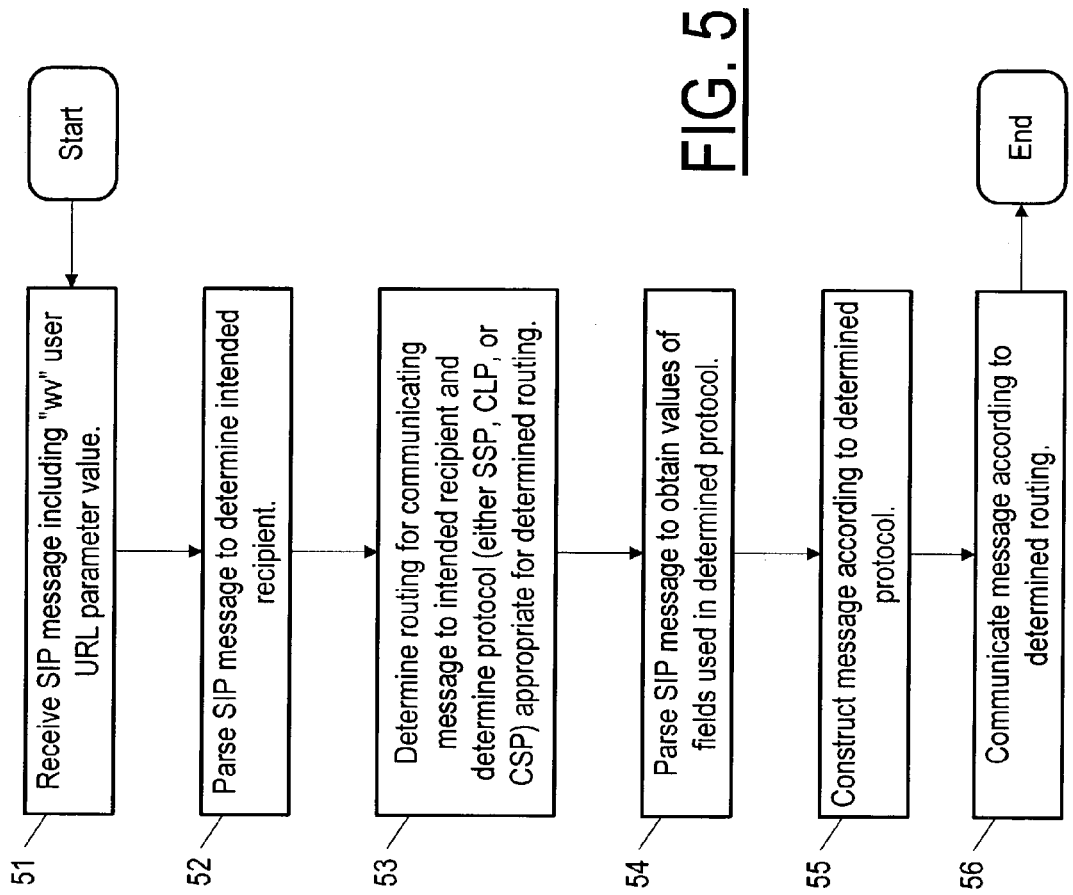
FIG. 5 is a flowchart showing a method provided by the invention, a method in which an SIP message having an SIP address but including the new user URI parameter value ("wv") provided by the invention is translated into a message according to a protocol appropriate for the intended recipient (the translation being performed by the gateway element of FIG. 1)

Referring now to FIG. 5, a flowchart is shown illustrating the operation of the IMS/WV gateway 14 in translating a message converted according to the invention (and so having the new user URI parameter "wv" but having "sip:" as the address scheme). In a first step 51, the IMS/WV gateway 14 receives the SIP URI message including "wv" as a user URI parameter value. In a next step 52, it parses the SIP message to determine the intended recipient (the WV client 12a). In a next step 53, it determines routing for communicating the message to the intended recipient and determines which (non-SIP) protocol (either SSP, CLP, or CSP) is appropriate, based on the routing. In a next step 54, it parses the SIP message to obtain values of fields used in the protocol to which it will translate the message. In a next step 55 it constructs the translated message according to the (non-SIP) protocol. In a next step 56 it communicates the message according to the routing determined in step 53.

The invention is aimed at maintaining standard IMS core network operation in providing a message to a WV client connected to a WV network, using SIP URI schemes but including a user URI parameter that has significance just in the last hop before the WV network. Doing so permits using WV addresses in a seamless manner, since the content of a WV address can be placed in an SIP URI and the new URI parameter is only used at the end point. The handling of a message with such a user URI parameter is similar to the conversion of a "tel" URL into a "sip" URI, as described in "*CPIM Mapping of SIMPLE Presence and Instant Messaging*," by B. Campbell and J. Rosenberg, Internet Draft (draft-ietf-simple-cpim-mapping-00), February 2002. The user can type a "tel" URL that contains the MSIDN number, but after an ENUM query, the URL is translated into an SIP URL and the "user=phone" header stores the information indicating it was originally a phone number. Schematically, (tel:+123232321->ENUM=>sip:+123232321@nokia-.com;user=phone|wv).

See e.g. S. Lind (AT&T), "*ENUM Usage Scenarios*," Internet Draft (draft-ietf-enum-usage-scenarios-00.txt), June 2002.

It should be understood that the invention is not restricted to providing interoperability between a client of an IMS network and a client of a WV network. The invention is more general. It is of use in case of routing a message through any first network using a first protocol when the message is intended for a client of a second network using another protocol, different from the first protocol. In the more general case, the message is converted so as to route it through the first network by changing the scheme of the message from indicating a protocol of the second network to indicating the protocol of the first network, and the user URI parameter is given a value indicating the protocol of the second network, i.e. the protocol indicated by the scheme before the message is converted.

Figure 6:
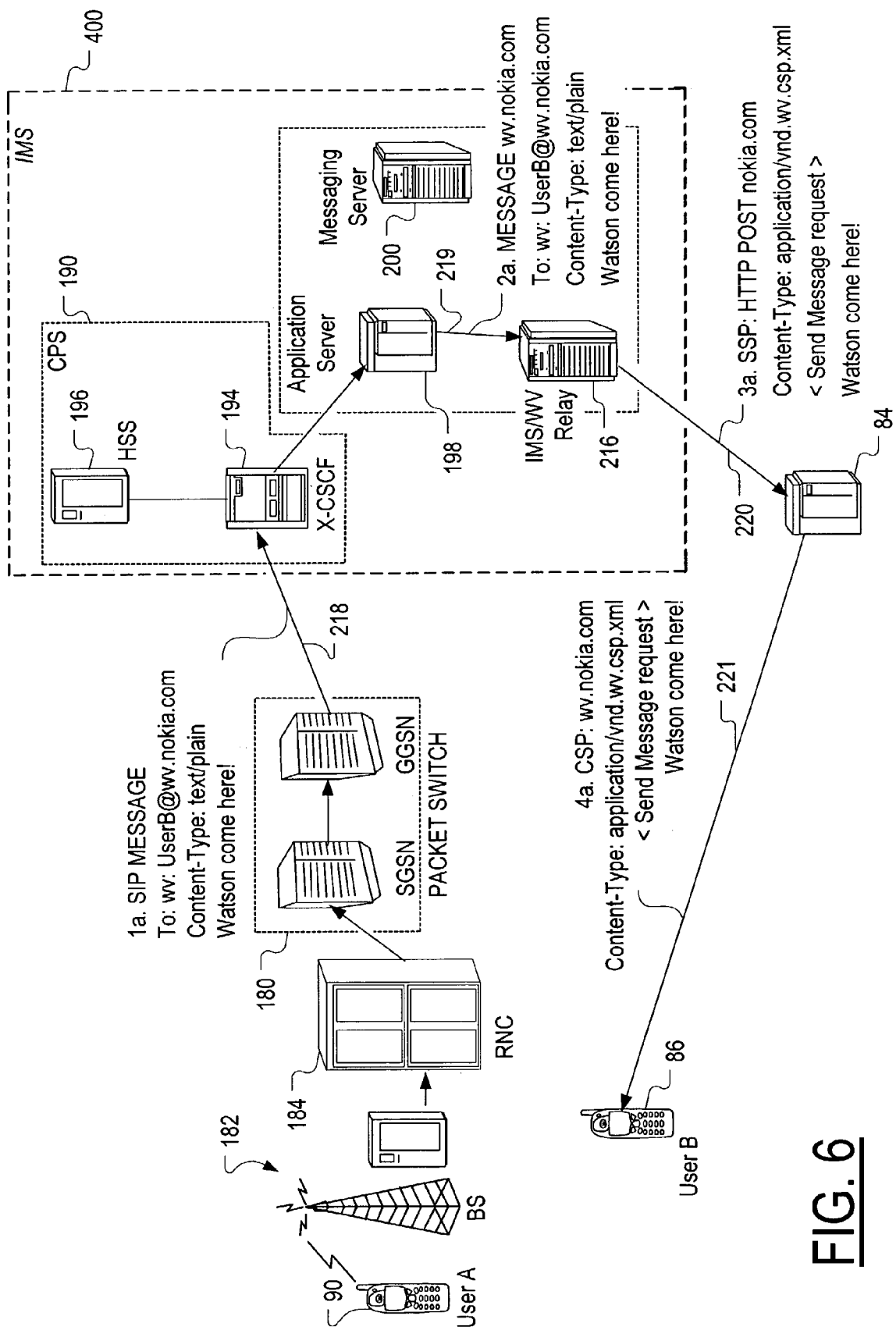
FIG. 6 shows a message sent from a user terminal in the IMS architecture having a "wv:" scheme, according to the present invention of using a new URL parameter for storing the "wv:" scheme.

Referring now to FIG. 6 for another perspective according to one particular scenario, a User A 90 of an IMS system 400 sends to a WV user B 86 (via a radio access network including a base station 182 and a radio network controller 184) an SIP message on a line 218 between a packet switch 180 and an XCSCF 194 as indicated by a reference numeral 1a. (The X-CSCF is part of a generic Call Processing Server (CPS) 190 that includes one or more different kinds of CSCFs (X-CSCF) 194 as well a Home Subscriber Server (HSS) 196.) Note the "wv:" scheme in the "To" header (if the systems allows it, or in a URI parameter; user=wv as in FIGS. 2 and 3 if the system returns an error when using the initial "wv" scheme) indicating to the X-CSCF 194 that the message should be sent onward towards an IMS/WV relay 216 which may be via an application server 198 as shown by a signal on the line 219 and with a format as indicated by a reference numeral 2a. (The message is sent to an application server 198 and/or to a messaging server 200 in case the operator has installed a specific messaging server for handling all transactions related to the messaging service.) The IMS/WV relay 216 then provides a translation according to step 55 of FIG. 5 from SIP to the SSP and provides the converted signal on a line 220 to a WV server 84 with a message format as shown at reference numeral 3a. The WV server 84 then converts the SSP message on the line 220 to a signal on a line 221 having a CSP format as shown at reference numeral 4a, for delivery to User B 86. Thus, as shown in FIG. 6, on the IMS side the address may contain an identifier ("user=wv" in a URI parameter or the To: header may contain the original WV address) that will enable the X-CSCF 194 to recognize that the message has to be forwarded to the IMS/WV relay 216. After that, the IMS/WV relay receives the SIP message on the line 219 and translates the content into the WV format and the transport protocol into the SSP.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for interoperating between a device operable in a first network and a device operable in a second network, the first network having a first server for communicating with the first device using a first protocol requiring that a message have a request uniform resource identifier including an address scheme, the second network having a second server for communicating with other servers in said second network using a second protocol and with the second device using a third protocol, the method comprising:
   converting a message constructed according to said first protocol but having as the address scheme a value indicating a protocol of the second network, into a converted message in which the address scheme has instead a value indicating the protocol of the first network, and the converted message also having a user uniform resource locator parameter with a value indicating a protocol of the second network; and
   transmitting the converted message on a communication path leading to a gateway element.

2. A method as in claim 1, wherein said first device performs said converting of said message.

3. A method as in claim 1, wherein said first server performs said converting of said message.

4. A method as in claim 1, further comprising translating to said second protocol or to said third protocol said converted message received according to said first protocol from said first server, or translating to said third protocol said message received from said first device without using said first server, and communicating said translated message to said second network.

5. A method as in claim 4, wherein said first network is an Internet Protocol Multimedia Subsystem network, and said translating is performed by an Application Server connected to said first network.

6. A method as in claim 4, wherein said first network is an Internet Protocol Multimedia Subsystem network, and said translating is performed by a gateway accessible to an Application Server connected to said first network.

7. A method as in claim 4, wherein said first network is an Internet Protocol Multimedia Subsystem network including call state control function entities, and said translating is performed by a gateway accessible to the Internet Protocol Multimedia Subsystem network entities connected to said first network.

8. A device, operable according to the method of operation of the first device as recited in claim 2.

9. A server, operable according to the method of operation of the first server as recited in claim 3.

10. An apparatus, comprising means for performing said translating said converted message to said second protocol or to said third protocol as recited in claim 4.

11. A system, comprising: a first device, a first server, and an apparatus as in claim 10, the first device operable in a first network and able to interoperate with a device operable in a second network, the first network including the first server for communicating with the first device using a first protocol requiring that a message have a request uniform resource identifier including an address scheme, the second network having a second server for communicating with other servers in said second network using a second protocol and with the second device using a third protocol, either the first device or the first server comprising:
   means for converting a message constructed according to said first protocol but having as the address scheme a value indicating a protocol of the second network to a converted message in which the address scheme has instead a value indicating the protocol of the first network, and the converted message also having a user uniform resource locator parameter with a value indicating a protocol of the second network; and
   means for transmitting the converted message on a communication path leading to a gateway element.

12. An apparatus, comprising:
   converting functionality, for converting a received message constructed according to a protocol of a first network but having as an address scheme a value indicating a protocol of a second network, into a converted message in which the address scheme has instead a value indicating the protocol of the first network, with the converted message also having a user uniform resource locator parameter with a value indicating a protocol of the second network; and
   transmitting functionality, for providing the converted message for transmission on a communication path leading to a gateway element.

13. An apparatus as in claim 12, wherein the first and second protocols are different and are either a session initiation protocol or a wireless village protocol.

14. An apparatus as in claim 12, wherein the user uniform resource locator parameter has a value "wv" or has a value "sip".

15. A server of a communication network, comprising functionality for routing messages to and from a gateway server, and further comprising an apparatus as in claim 12.

16. A server of a communication network as in claim 15, wherein the server is configured for communication using session initiation protocol.

17. A server of a communication network as in claim 15, wherein the server is configured for communication using wireless village protocol.

18. A user equipment terminal configured for communication with a server of a communication network, comprising an apparatus as in claim 12.

19. An apparatus, comprising:
   means for converting a message constructed according to a protocol of a first network but having as an address scheme a value indicating a protocol of a second network, into a converted message in which the address scheme has instead a value indicating the protocol of the first network, with the converted message also having a user uniform resource locator parameter with a value indicating a protocol of the second network; and
   means for providing the converted message for transmission on a communication path leading to a gateway element.

20. An apparatus as in claim 19, wherein the first and second protocols are different and are either a session initiation protocol or a wireless village protocol.

21. A method, comprising:
   converting a message constructed according to a protocol of a first network but having as an address scheme a value indicating a protocol of a second network, into a converted message in which the address scheme has instead a value indicating the protocol of the first network, with the converted message also having a user uniform resource locator parameter with a value indicating a protocol of the second network; and providing the converted message f or transmission on a communication path leading to a gateway element.

22. A method as in claim 21, wherein the first and second protocols are different and are either a session initiation protocol or a wireless village protocol.

* * * * *